United States Patent [19]

Middel et al.

[11] Patent Number: 4,685,422
[45] Date of Patent: Aug. 11, 1987

[54] AUTOMATIC APPLICATION OF TEAT CUPS

[75] Inventors: Roelof G. Middel; Rinke Oenema, both of Oenkerk, Netherlands

[73] Assignee: Gascoigne-Melotte B.V., Emmeloord, Netherlands

[21] Appl. No.: 772,958

[22] PCT Filed: Dec. 20, 1984

[86] PCT No.: PCT/NL84/00044
§ 371 Date: Aug. 30, 1985
§ 102(e) Date: Aug. 30, 1985

[87] PCT Pub. No.: WO85/02973
PCT Pub. Date: Jul. 18, 1985

[30] Foreign Application Priority Data

Dec. 30, 1983 [NL] Netherlands ................. 8304498

[51] Int. Cl.⁴ .............................................. A01J 5/00
[52] U.S. Cl. .................................. 119/14.13; 119/14.08
[58] Field of Search ............... 119/14.02, 14.03, 14.08, 119/14.13, 14.14

[56] References Cited

U.S. PATENT DOCUMENTS

| 79,868 | 7/1868 | Graves ........................... 119/14.47 |
| 3,605,695 | 9/1971 | Thomas et al. ................. 119/14.13 |
| 4,010,714 | 3/1977 | Notsuki et al. ................. 119/14.03 |
| 4,344,385 | 8/1982 | Swanson et al. ............... 119/14.14 |
| 4,508,058 | 4/1985 | Jakobson et al. ............... 119/14.02 |

FOREIGN PATENT DOCUMENTS

| 91892 | 10/1983 | European Pat. Off. . |
| 2849227 | 5/1979 | Fed. Rep. of Germany . |
| 82592 | 6/1971 | German Democratic Rep. . |
| 138077 | 11/1974 | Japan . |
| 2007486 | 5/1979 | United Kingdom . |

OTHER PUBLICATIONS

Landtechnik, vol. 35, No. 5, May 1980, (Hannover, DE) D. Ordolff: "Melkzeuge Automatisch Ansetzen—Demnachst Wirklichkeit, pp. 222-224.

Primary Examiner—Paul J. Hirsch
Attorney, Agent, or Firm—Dennison, Meserole, Pollack & Scheiner

[57] ABSTRACT

This invention improves milking units for cattle in order to give better milking results and to facilitate application of the milking unit to the udder of the animal. To this end the teat cups have an upwardly widening upper part, so that the teat cups also engage the lower part of the udder right above and around each teat. Moreover, the teat cups are supported, preferably flexibly, in a common supporting structure so as to by substantially horizontally movable therein, to be easily adjusted to the relative positions of the teats in a particular animal. The teat cups may have operating means to move them to the correct positions under control of means comprising a memory for storing data about such positions for a particular animal and a processor programmed so as to move the cups into the correct positions.

23 Claims, 7 Drawing Figures

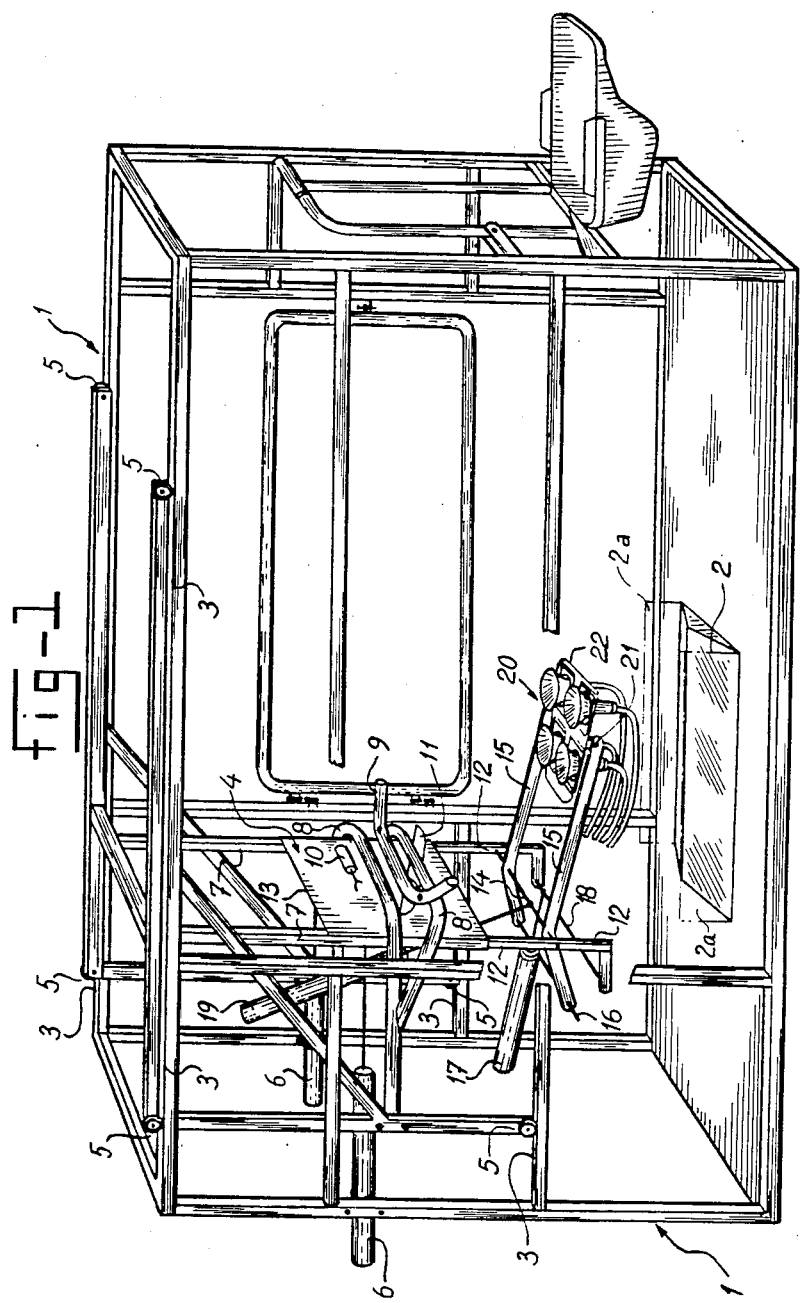

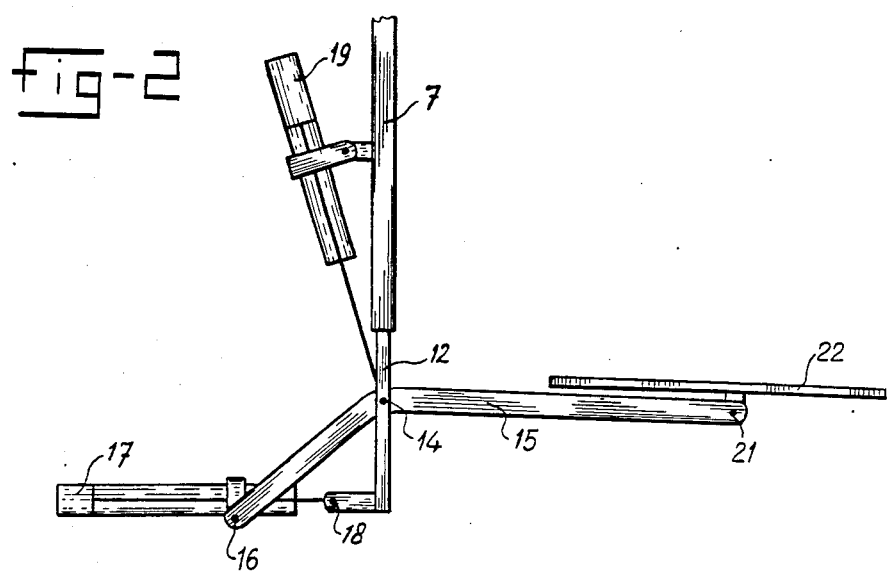
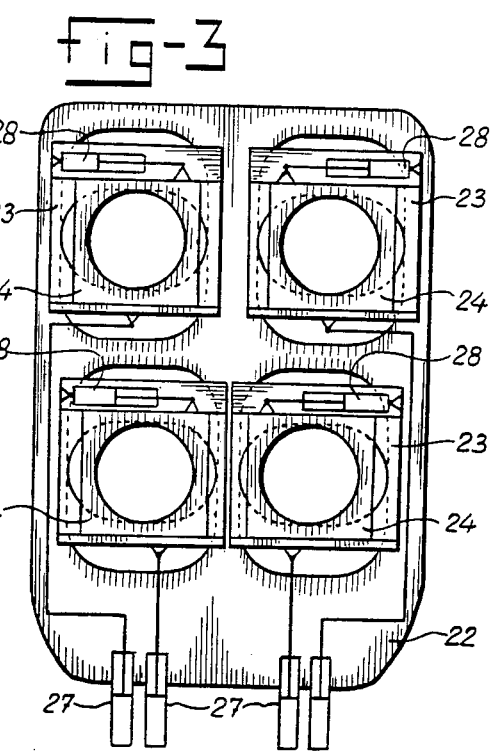
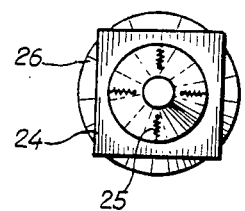
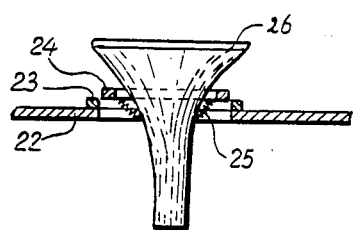

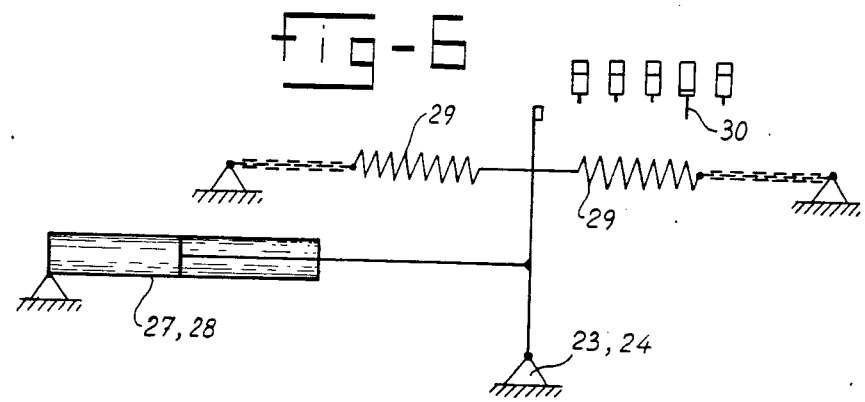
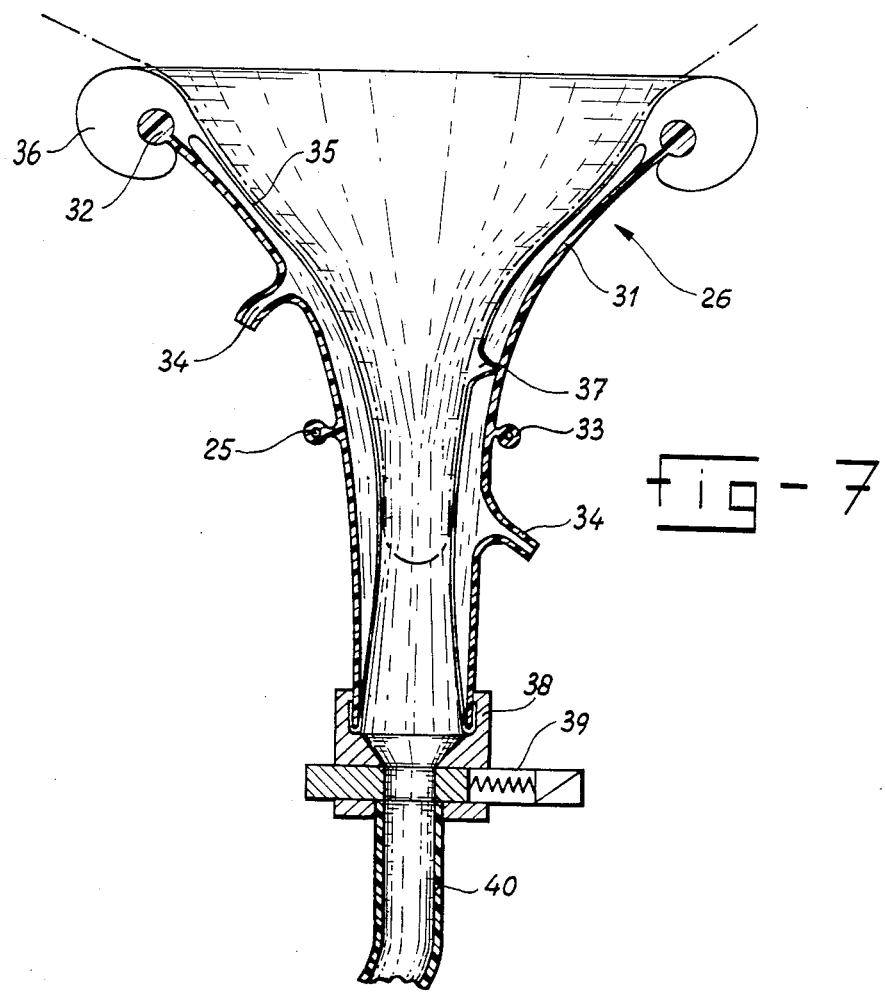

AUTOMATIC APPLICATION OF TEAT CUPS

This invention relates to a device for milking cattle and to a method for operating such a device.

In known milking devices for cows as usual at present, a milking device comprises a claw piece, to which four teat cups are connected, each one by a separate hose. Such devices require hand engagement of each separate cup to connect it to the teats, often in a small space for the personnel and without a good view of the position of the teats. It has been tried to improve this, e.g., as shown in U.S. Pat. No. 4,010,714, by supporting the teat cups in adjusted mutual positions to a supporting structure movable upwardly to engage the teats, or, as shown in German published application No. 2.849.227, by providing the teat cups with guiding discs guiding the teats into the cups by sideways movements. It also known to have one cup for all the teats, with a flexible liner inside the cup so shaped as to take up all the teats in preformed depressions.

The present invention aims at improving such known milking devices as to the facilitation of the engaging of the cups with the teats and also as to the milking effect itself.

To this end a device for milking cattle is according to the invention first of all characterized in that the milking unit comprises a number of teat cups supported individually as separate bodies by a supporting structure movable in the device so as to be moved upwardly for engagement with the teats, said teat cups widening upwardly in their upper parts so as to be adapted to engage and surround the teats with their lower narrower parts and to engage and surround the lower part of the udder above each teat during milking.

This makes it easy to apply the cups to the teats by upward movement of the supporting structure, as the teats will be taken up easily by the wide top parts of the cups and be guided therein to the correct position and moreover, the engagement of the lower part of the udder by the wider parts of the cups appears to give a better milking effect.

Preferably, the cups underly a resilient upward pressure by the supporting structure, which appears to improve the milking effect.

The invention allows easy adjustment of the relative positions of the teat cups with respect to the supporting structure to adapt the positions of the cups to a particular animal. A further object of the invention is the further automation of milking, in particular in the engagement of the cups with the udder and teats as adapted to the special form of the cups according to the invention. In this respect the invention also proposes a new method of operating the milking device according to the invention, by programming a processor with the coordinates for the positions of the teat cups in a particular way to be described.

Moreover, the invention proposes a further improved embodiment of the cups and of the supporting structure and the further parts of the device in view of the objects given above.

It is possible to apply the invention in all existing types of stables, in milking parlours or cubicle barns, in single milking boxes or stools or in rows thereof, if desired in combination with automatic food or concentrates supply, cleaning and other devices for pre- or aftertreatment of the animals and of the milking device itself. The device may have a usual pulsating and suction system, collecting means for the milk etc. The invention will now be explained in more detail with reference to the enclosed drawings.

Therein:

FIG. 1 is a perspective view of a milking box for cows according to the invention;

FIG. 2 is a side view of part of the supporting structure somewhat diagrammatically and on a larger scale;

FIG. 3 is a top view of the frame carrying the teatcups;

FIG. 4 is a view from below of one teatcup with its suspension;

FIG. 5 is a horizontal view of the parts of FIG. 4;

FIG. 6 is a diagrammatic view of operating means for a sliding part taking up a teatcup; and FIG. 7 is a vertical section through a teatcup in a preferred embodiment of the invention.

FIG. 1 shows a milking box consisting of beams forming an open frame, being substantially open at the backside as seen in this Figure, so that the cows can enter the box from that backside. If desired the box may have a slidable or pivotable beam, door or grate for closing said opening at will.

In FIG. 1 the milking unit is supported from the lefthand side. If it is desired to have the cow enter the box from that side, this milking unit with its supporting structure may be mounted on a door, which is pivotally mounted and supported by one of the vertical beams of the frame. The entry opening for the animal may also serve as an exit opening, but it is also possible to have the exit opening e.g. at the front end which is the right end in FIG. 1, where there may be a door which on pivoting takes with it the usual feed trough.

In FIG. 1, for the sake of clarity, part of the front beams and tubes has been omitted and the same is true for part of the milkhoses, vacuumhoses, operating means, bowdencables, electric wires, detection means, etc.

The bottom of the box has a central longitudinal ridge 2 with sides sloping downwardly and consisting of or covered or coated with a smooth material, so that the cow will put its hindlegs to both sides thereof to allow enough space between those legs to allow engagement of the milking unit from behind in and through said space. Preferably, the two inclined sides forming said ridge may be pivotable about their longitudinal lower side, so that, after the cow has entered the box, these sides may be pivoted upwardly to the positions 2a shown by dotted lines, allowing the milking unit 20 to be described to move more closely along the floor and between these sides towards and away from the animal.

Horizontal beams 3 support a supporting structure 4 for the milking unit, said structure having rollers 5 for such movement, which is caused by hydraulic or pneumatic cylinders 6.

The supporting structure 4 carries plates or tubes 8 and 9 adapted to enter into pushing contact with the cow and intended to act as a reference device. The tube 9 has such a winged shape that the position of the cow in its longitudinal direction is fixed and that the cow is also centered in the box in the transverse direction. These parts 8 and 9 have such shapes and are positioned at such a height thay they push onto those higher backparts of the animal, which are closest to its bones, e.g. its tailbone, to avoid inaccuracies of positioning by too easily compressible muscleparts, which might spoil the accurate positioning.

A tail guide 10 and a dung gutter 11 serve to avoid manure and urine to fall on movable parts of the box.

Vertically slidable beams 12 are guided with their upper parts in hollow vertical beams 7 and there may be tension springs, steel cables and counterweights not shown to bias the beams upwardly into contact with an abutment in or on said beams 7.

A horizontal shaft 14 extends between the beams 12 and arms 15 are pivotally arranged thereon, said arms consisting of straight parts as shown or being U-shaped between shaft 14 and their ends at 21 if desired.

Between the left ends of the arms 15 there is a rod 16 connected to an operating cylinder 17, of which the plunger rod is connected to a rod 18 extending between the lower ends of the beams 12. These parts serve to support the milking unit and this is clarified by FIG. 2 showing that, when pneumatic cylinder 17 is extended, the plunger thereof pushes on rod 18 so that the cylinder moves to the left, moving rod 16 upwardly by pivoting around shaft 14 and thereby the long right ends of the arms 15 move from the position shown in FIG. 2 to a lower position as in FIG. 1 and much lower.

Separately from or in a combination with these movements the entire supporting structure may move up and down by means of pneumatic cylinder 19 causing sliding of the beams 12 into and out of the beams 7.

Cylinders 17 and 19 may of course take up other positions than shown and a more vertical position is preferred.

The milking unit is indicated by 20 and is supported at the ends of the long parts of the supporting arms 15 in a pivoting connection at 21 to pivot about a horizontal transverse axis. Pivoting about a longitudinal axis is not shown but is also possible if desired, to give a universal joint suspension.

The milking unit has a frame 22, supporting the teatcups. In this embodiment this frame is embodied as a flat plate, e.g. of plastics material, with four wide holes. FIGS. 3, 4 and 5 show that above each hole there are two substantially rectangular plates 23 and 24. The plates 23 have an elongated hole as shown in dotted lines in FIG. 3 and rest on plate 22, there being guides not shown to guide the plates 23 in their longitudinal movement on plate 22. The plates 24 are smaller, rest slidably on plates 23 and can only move in the transverse direction, perpendicularly to the direction of movement of the plates 23. They are guided by guides not shown on plates 23. The teatcups 26 are carried by the plates 24, there being springs or elastic straps 25 to suspend each teatcup resiliently in its plate 24 as clearly shown in FIG. 5. This allows for both vertical, horizontal and tilting movements of each teatcup in its plate 24.

Cylinders 27, hydraulic or pneumatic, supported by plate 22, are adapted to move the plates 23 longitudinally of plate 22, carrying with them the plates 24 in such movement. There are four cylinders 27 allowing individual movement of each plate 23. On each plate 23 there is a cylinder 28 for moving the plates 24 transversely on their plates 23. It is also possible to position the cylinders 27 and 28 at a distance from plate 22, e.g. near rod 16, with movement transmitting linkages to the plates 23 and 24 by rods and levers, bowdencables, cables on rollers or the like.

Anyhow it is important that the center of gravity of the milking unit as far as suspended from the arms 15 has such a position that plate 22 will substantially maintain a horizontal position and will not tilt too much.

It may be desired to introduce means not shown to move the whole milking unit 20 horizontally in longitudinal direction of the box with respect to the beams 12 and the parts 8 and 9 giving a reference position with respect to the cow. This may easily be done, e.g. by giving arms 15 telescoping parts with a hydraulic or pneumatic cylinder to lengthen or shorten them at will.

Instead of the plates 23, 24 as shown, there may be arms pivoting about a vertical axis and each carrying a teatcup and having a single drive supported by plate 22 or a similar part to swing each supporting arm to the desired position.

The structure may be simplified taking into account that in most cases there is sufficient symmetry between the two front teats and the two back teats mutually with respect to a vertical longitudinal plane of the animal and that the front teats are in the same transverse plane perpendicular thereto and the same is true for the back teats. This means e.g. for a structure as shown in FIG. 3 that there need only be two cylinders 27, one for the front teatcups and one for the two back teatcups, which means that there also need only be two plates 23. Moreover, the two front plates 24 may be connected by means such as a fulcrum lever so that they move oppositely always to the same extent, e.g. by one cylinder 28 and the same is true for the back plates 24.

Cylinders 27 and 28 may in usual embodiment have measuring and clamping means allowing signalling of the position at each moment and lengthening or shortening in steps or even stepless with locking in each stationary position.

The cylinders may also have a limited number of positions, even two or three. There may be two positions with the cylinders fully in or fully out, three positions with a central or neutral position etc. In FIG. 6 it is shown that the neutral position may be taken up automatically by connecting the rods of the cylinders 27, 28 not only to their plate or plates 23 or 24, but also to springs 29 tending to maintain the piston rod in the neutral position. For more positions there may be controlled abutments 30, e.g. solenoid controlled and in FIG. 6 there are five such abutments, of which the fourth from the left is out to limit movement of the concerning cylinder 27 or 28. This diagrammatically shown system may of course be embodied in many different ways.

The teatcups 26 themselves may be embodied as shown in FIG. 7 and have a hard outer wall 31 of substantially hoppershape, made of e.g. hard plastic material or metal, with a thickened upper edge 32 and connecting lugs 33 to suspend them, e.g. to the springs 25 of FIGS. 4 and 5 or to helical springs each fully surrounding a teatcup below the lugs 33 and connected at its lower end with a sleeve surrounding the teatcup and supported in e.g. the plate 24 or a supporting arm pivoting about a vertical axis. The wall 31 has one or more, in this case two, connections 34 for the pulsating system so that alternately vacuum and atmospheric pressure may be admitted into the cup.

In the outer wall there is the elastic liner 35 as usual, fitting gas tightly around the upper edge 32 of wall 31 and thickened as shown at 36. This thickened edge may consist of massive or foamy elastic material but, as shown, it may be hollow and filled with a gas or a liquid. The upper part of the liner 35 entering into contact with the lower part of the udder above the teat may if desired have a greater wall thickness so as to be more rigid than the lower part. At 37 it is indicated that the liner 35 may be connected to the inside of the wall 31 between its ends to form two chambers between the liner and the hard outer wall 31, one above and one below this connection 37. By the separate connections 34 above and below this zone 37, pulsations may be applied thereto which differ somewhat in phase so that the pulsations in the space above 37 are somewhat ahead of those in the lower part, which gives a better milking result.

The top edge of the cup need not be a circle in one plane perpendicular to the vertical axis, but this edge may be higher e.g. at the outside of the udder and at the front or back and lower at the part near the longitudinal center of the animal for a good adaptation to the shape of the udder. Sensors or other means near the top edge of the cup or magnetically inductive coils in the top part of the cup or other means may be provided in order to have check whether the teat is engaged correctly, may give a warning signal if this is not the case and may stop the movement of application of the milking unit to the udder, cause it to move down again and repeat the upwardly engaging movement. There may also be liquid detectors in the lower part of the cups or in the milkhoses connected thereto giving signals about the flow of milk therethrough.

At the lower end of the cup this may have an electromagnetically operated valve 39, e.g. of sliding type, having a wide opening and being operated so as to open and close synchronously with the pulsations, so that it is avoided that upward jets of milk hit the teats and cause mastitis. Generally known means to detect and terminate the milking period may be applied both to remove the milking unit and to close such valves.

Milkhose 40 also has preferably a wide and uniform passage and is connected to the usual means such as a milking claw etc. and there is preferably one indicator for milkflow per hose. This allows terminating of the pulsations to a certain teatcup if the milk quantity per unit time therefrom sinks below a certain level, which measure is known as such. It is then also possible to close valve 39. For so-called three-teat-cows control means may close the concerning valve 39 and stop the pulsator to this cup, so that only three teats and udder parts are milked.

After pretreatment of the cow, the engagement of the milking unit 20 takes place in the following manner: a cow enters the box and is recognized by a cow-identification system not shown and known as such, e.g. embodied by a code transmitter or magnetically readable identification code element carried by the cow. The identification code is transferred to a controller in which said code is associated with specific coordinates relating to this particular cow whereafter a processor in said controller causes the operation of the cylinders 27 and 28 to move the cups 26 into the desired positions.

The movable part 4 of the supporting structure is, with the milking unit 20 in a low position, moved forwardly by the cylinders 6 until the parts 8 and 9 (the reference device) push against the cow, the tail being moved sideways by tailguide 10. Tube 9 centers the cow in cooperation with the raised part 2 in the center of the box. If this supporting structure connot be moved further by cylinders 6, leakage valves and reduction valves enter in operation so that the cylinders 6 will maintain some pressure on the cow but backward movements thereof will not cause undesired rises in pressure. Together with the supporting structure 4 the milking unit and its supporting parts have moved forwardly and the reference device, maintaining in contact under some pressure with the cow, thus forms a good basis for the use of the coordinates of the teats determined with respect thereto. By the centering of the cow by part 9 the same is true in transverse direction.

Thereupon cylinder 17 is shortened, so that the arms 15 are moved from their low position into a high position. Almost simultaneously therewith cylinder 19 is elongated, so that the beams 12 and all the parts supported thereby move downwardly. The speed and amount of this downward movement are chosen so that the milking unit does not touch the floor but is moved forwardly at a very short distance above the floor. In this way the milking unit is brought to the position right below the udder without touching it. For low, so-called deep udders this is important because it would be difficult for the milking unit to pass the udder when in a higher position. As stated, upturned parts 2 of the floor (position 2a) allow a very low path of the milking unit during this movement.

Now cylinder 19 is shortened so that the milking unit is raised. It is preferred to apply vacuum to the pulsation space in the teatcups so that the liner 35 is sucked against the hard outer wall 31 to take up the teats easily and allow them to sink deeply into the cups. After this movement milking begins in known way by suction and pulsating pressures. Meanwhile the upward pressure of the milking unit against the udder remains to be exerted because cylinders 17 and 19 are operated so as to be maintained under some pressure in the corresponding directions. Leakage and reduction valves take care of discharge of superfluous air and/or interrupting the supply of air if the pressure in the cylinders becomes too high.

At the end of the milking, cylinder 17 is lengthened so that the longer parts of the arms 15 lower the milking unit, so that the teatcups are discharged from the udder. If desired cylinder 19 may be lengthened simultaneously therewith. Before the milking unit 20 touches the floor, cylinder 19 is shortened again, so that the movement of the arms 15 may continue and the milking unit is lifted in time. Simultaneously therewith or immediately thereafter cylinders 6 are shortened, so that part 4 of the supporting structure with all the parts suspended thereon or connected thereto move backwards so that the starting position is taken up again.

If desired a cleaning system now enters into operation so that the next cow can be connected to a milking unit which has meanwhile been cleaned. It is also possible to give an aftertreatment to the cow just milked according to any known treatment.

The arms 15 may if desired exert a constant upward force additional to the force exerted by cylinder 17 by weighing rod 16 e.g. by counterweights.

By the several pivoting possibilities: arms 15 with the milking unit in longitudinal direction, if desired also in the transverse direction (not shown), by pivoting about shaft 14 and by several adjustable resilient forces such as by the springs 25 on the teatcups, by cylinder 17 for the arms 15, if desired supplemented by counterweights, and by cylinder 19 for the entire supporting structure, if desired supplemented by springs and counterweights, it is made possible to apply the milking unit in a flexible way and to keep it movable also during milking.

As other animals than cows suited for being milked by a device according to the invention, goats may be mentioned.

The invention is applicable in many types of milking parlours such as rotary parlours, herringbone parlours, abreast parlours etc.

By applying the invention it is possible to make the milking parlour superfluous as a separate unit by positioning milking boxes as shown in a cattle stable, e.g. in a cubicle barn. In that case the combination with a programmed system for supplying food, fodder, concentrates etc. offers many advantages. One advantage thereof is that the same processor may be used for integrally controlling the supply of such food and the milking, which may also be combined with the registration of the milk quantity delivered. The several actions taking place according to the invention may fully be controlled by the processor. In combination with the known electronic cow identification system also used for the programmed supply of food and by the use of the necessary sensors etc. it is possible to have the milking process take place fully automatically.

The controller comprises a memory containing for each cow specific coordinate values enabling the processor to operate the cylinders 27 and 28 to bring the teatcups in the correct position. At each milking turn, preferably immediately after engaging the milking unit to the animal, the processor is switched to a monitoring status whereby the cylinders are enabled to move freely without being controlled by the processor during a very short period so that the cups may be moved easily by the teats themselves. After reaching in this way the desired position of the cups to be used during milking, the coordinates of this desired position will be derived and stored by the processor in the memory. If desired these coordinates are treated arithmetically, e.g. to determine the average value of those coordinates from several milking operations. Thus during the next milking turn or turns the cups may be positioned initially in agreement with the stored coordinates, which positions are at least approximately correct for the concerning cow, so that the engagement takes place correctly. Thereafter the positions are thus automatically corrected to take account of changes in the teat positios depending on the age of the animal and the stage in the lactation period. In fact this means that the milking unit itself operates as a measuring apparatus for the positions of the teats. For a new animal it is possible to adjust the teatcups by hand before this procedure begins. It would also be possible to have a separate measuring device for measuring the relative positions of the teats and to supply the corresponding coordinates to the memory of the processor.

This processor may furthermore be programmed such that, based on additional data stored in the memory or contained in the programme, the processor decides whether the concerning cow should be milked or not depending on the requirements of the particular situation, lactation stage and quantity of milk to be expected.

It is moreover possible to have the cylinders 27 and 28 or other parts of the supporting structure move so as to give a searching movement of the teatcups for more easily taking up the teats, e.g. a linear to and fro movement, a circular movement, a vibrating or spiral movement etc.

The invention easily allows to milk the cows more than once per day, e.g. four or five times. The number of boxes per stable and the plan of the boxes is easily entirely adapted thereto. This has a favourable influence on the health of the udders, milkproduction and lifespan of the animal.

We claim:

1. A device for milking cattle, including a milking unit comprising:
    (a) a plurality of teat cups, each of said cups widening upwardly in its upper part, said widening part comprising a substantially rigid casing, adapted to be engaged with an udder during milking, each of said teat cups also including a lower, narrower part adapted to engage and surround a teat during milking;
    (b) a supporting structure for said teat cups, said structure including means for individually supporting each of said teat cups as a separate body, and means for moving said teat cups upwardly to a milking position for engagement with the teats; and
    (c) means exerting a resilient upward pressure on the teat cups in the milking position, whereby the upper part of each of said teat cups is engaged with an udder and the lower part of each of said teat cups is engaged with a teat.

2. A device according to claim 1, in which the teat cups are supported by the supporting structure so as to be substantially horizontally movable with respect to each other.

3. A device according to claim 2, comprising operating means for moving said teat cups substantially horizontally into a desired position and to keep them in said position.

4. A device according to claim 3, in which the teat cups are supported by slides supported in the supporting structure, the operating means for moving the teat cups into a desired position engaging said slides.

5. A device according to claim 4, said teat cups being supported in said supporting structure by flexible resilient means keeping them in a predetermined position flexibly, i.e. while allowing adaptations of said position to the position of the teats and udder by forces exerted thereby on the cups.

6. A device according to claim 5, in which the teat cups are supported by said resilient means so as to be movable both horizontally and vertically with respect to said supporting structure.

7. A device according to claim 4, in which the supporting structure supports two slides for the same cup, one movable in one substantially horizontal direction and the other moving in a substantially horizontal direction transverse to said first-mentioned direction, one of said slides being supported by the other one so as to move therewith.

8. A device according to claim 3, in which the operating means for moving the teat cups have means for combined mutually opposite movement of two teat cups in about the same transverse plane of the animal with respect to the vertical longitudinal central plane of the animal.

9. A device according to claim 1, including a flexible inner lining in the teat cups defining an inner wall and a space for the pulsating fluid necessary for milking in the rigid outer casing of the cups, said inner lining also extends over said upwardly widening part of the cups.

10. A device according to claim 9, in which the flexible inner lining of the teat cups is more rigid in the said widening part than in its teat engaging part.

11. A device according to claim 9, in which the said lining forms two separate pulsation chambers in the teat cup, one chamber substantially in the widening part and one in the teat engaging part.

12. A device according to claim 11, in which the pulsating means are embodied and connected to said pulsation chambers in such a way, that the pulsations in the chamber in the widening part are earlier in phase than the pulsations in the chamber in the teat engaging part.

13. A device according to claim 12, in which the teat cup at its upper wide end has a flexibly-elastic edge for engagement with the udder, said edge being thicker than the remainder of the cup.

14. A device according to claim 13, in which said thickened edge is formed by a hollow part filled with a fluid.

15. A device according to claim 1, in which each teat cup has means to establish a flow of milk from said cup.

16. A device according to any of the preceding claims, in which each teat cup has a valve near its lower end to interrupt the connection between its interior and the vacuum milk discharge means.

17. A device according to claim 1, in which the milking unit is supported in the device so as to be movable horizontally in its entirety in the longitudinal direction of the animal.

18. A device according to claim 17, in which the milking unit is supported by arms in the supporting structure through a horizontal axis, about which it is freely pivotable.

19. A device according to claim 18, having a fixed frame, means to move supporting means for the milking unit substantially vertically with respect to said frame, and a horizontal pivoting axis in said supporting means, about which supporting arms are pivotable, which carry the milking unit.

20. A device according to claim 17, in which the horizontally movable means have means to contact the animal in the zone of bone parts at its back to limit said horizontal movement by contact under a certain pressure with the animal, said horizontally movable means having means to maintain such a pressure flexibly during milking.

21. A device according to claim 20, in which the horizontally movable means also carry means to engage the sides of the back end of the animal to limit sideways movemetns thereof with respect to the axis of the milking unit in the longitudinal direction of the animal.

22. A device according to claim 21, in which the horizontally movable means also carry a tail guide and a discharge for faeces and urine.

23. A device according to claim 22, in which the device has a floor having a higher part in the centre corresponding to the zone around the central line of the milking unit in the longitudinal direction of the animal and parts lower than said higher part to both sides thereof, making it difficult or impossible for the animal to stand otherwise than with one back leg to each side of said higher part, which comprises pivoting parts movable between the position to form said higher part as a substantially closed floor surface and a more upstanding position inside and close to the hindlegs of the animal.

* * * * *